Patented Nov. 8, 1938

2,135,964

UNITED STATES PATENT OFFICE 2,135,964

AZO DYESTUFFS AND FIBER DYED THEREWITH

Miles A. Dahlen, Wilmington, and Frithjof Zwilgmeyer, Arden, Del., assignors to E. I. du Pont de Nemours & Company, Wilmington, Del., a corporation of Delaware No Drawing. Application July 22, 1936, Serial No. 91,906

10 Claims. (Cl. 260—166)

This invention relates to azo dyes, especially to new insoluble azo compounds or dyes which are suitable for printing, dyeing and pigmenting, to processes of making the azo dyes, to processes of dyeing materials with an azo dye and to materials dyed with an azo dye.

The azo dyes are a well-defined group containing the chromophor —N=N—. The chromogen of azo dyestuffs comprises two aryl radicals with the chromophor between them. The mono azo dyes are generally prepared by joining two components of which the first, an amine, is called the azo component, and the second, usually a phenol, an amine, or an active methylene compound, is called the coupling component. In coupling the components, the azo component is diazotized in a manner which will be understood by persons skilled in the art, and is reacted with the second component, often in solution. Generally speaking, the aryl nuclei of the azo dyes may contain certain substituents which change, but do not originate, the color of the dyestuffs and are called "auxochromes". The auxochromes form a recognized class, divided into two groups, of which the one tends to make the dyestuff water-soluble, and the other does not. In this invention those auxochrome groups which tend to make the dyestuff water-soluble are called s-auxochromes and those which do not are called n-auxochromes.

The prior art azo dyes are applied to fabrics, or to other materials to be dyed, in three general ways: (a) The dyestuff is dissolved or dispersed in a suitable bath and the material is dipped in the bath. To be used in this manner the completed dyestuff must be substantive to the material which is to be dyed. (b) A substantive coupling component is directly affixed to the fabric, which is then treated with the diazotized component, completing the dye on the material. (c) A substantive azo component is directly affixed to the fabric which, treated with the coupling component, completes the dye on the material.

The term substantive means that the dye or the particular component has substantial affinity for the material from aqueous solution or suspension. So far as we are aware no instances are recorded of a material having been dyed with an azo color of which none of the azo, nor the coupling component, nor the complete color were substantive. We are not aware of any azo dyes having the coupling component hereinafter to be described.

It is an object of this invention to dye material with an azo dye. Another object of the invention is to produce materials dyed with a new dyestuff. Another object of the invention is to produce new dyestuffs. Another object of the invention is to provide processes of making the new dyestuffs. Still other objects of the invention will be apparent from the following description, in the course of which various examples are set forth as illustrations.

The objects of the invention are accomplished generally by disposing, either simultaneously or alternately, the coupling component and a water soluble azo component stabilized against reaction with each other, in or upon the material to be dyed so that the components will be affixed to or impregnate the material, and by reacting the components with each other in or upon the material. The objects of the invention are also accomplished by reacting the components of the dye with each other to produce the dye apart from a material to be dyed. The objects of the invention are also accomplished by the production of a material dyed with the new dyestuffs. More specifically the objects of the invention may be accomplished by impregnating a fabric or article to be dyed with a non-acid composition, such as a paste, powder or solution containing an arylazo-aminoacylnaphthol coupling component, hereinafter to be more particularly described, and an azo component diazotized and stabilized against reaction with the coupling component, and by exposing the impregnated material at elevated temperature to the action of a weak acid, thereby to effect the ocupling of the components and the formation of the dye.

The coupling component is an aryl-azo-aminoacylnaphthol in which the aryl and naphthol nuclei may or may not have one or more auxochrome substituents and in which the NH—acyl— group is on one of the benzene rings of the naphthol nucleus and the OH— group is on the other benzene ring of the naphthol, such as the compound represented generally by the following formula:

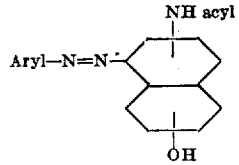

which is described and claimed in our copending application Serial No. 91,907, filed July 22, 1936. It is evident that a large number of these coupling components can be made from the compounds known to the art.

In the practice of the preferred form of the invention the azo component, diazotized, is coupled with a stabilizing agent: For instance, it is joined by the azo group to the nitrogen group of piperidine carboxylic acid. After stabilization this component can be mixed with the coupling component without reaction provided the mixture is neutral or non-acid. The presence of an acid medium would break up the stabilized azo component, which would immediately react with the coupling component to form the complete color.

In the form of the invention which involves the dyeing of a cloth by the so-called process of printing, the azo component, diazotized and stabilized in the well-known manner, is mixed in a basic paste with the second component, and the paste is applied to an etched or "printing" roller which impregnates the fabric by contact. The fabric may then be placed in a closed container to be subjected for a few seconds at elevated temperature to the action of the fumes of an acid, usually in the presence of water vapor. The acid used may conveniently be acetic acid. The acid neutralizes the basicity of the paste, the stabilizer is broken up, the first component is freed, and reacts with the coupling component. It is our surprising discovery that by this method azo colors which could not be used for dyeing because neither the azo component, the coupling component, nor the dye itself were substantive, can be used to color fibers and other dyeable materials and produce a superior dyeing. These dyes may advantageously include auxochromes as substituents in the aryl nuclei. The n-auxochromes are, specifically, the groups alkyl, alkoxy, halogen, aryloxy, aralkyl, aralkoxy, aryl, hydroaryloxy, and trifluoro-alkyl. Generally speaking, entirely satisfactory results can be obtained by the substitution in the aryl nuclei from one to three of these substituents but more can be used. The n-auxochromes are also satisfactory substituents in the aryl nuclei of the coupling component. However, coupling components having no n-auxochrome substituents generally may be made to produce excellent colors; and, consequently, the number of n-auxochrome substituents in the coupling component, even in the preferred form of the invention, varies from zero to the limit of its capacity.

The invention is further amplified by the following examples which are mentioned as illustrations and not as limitations.

*Example I*

13.8 parts of meta-nitraniline were diazotized in the usual manner and the diazo-salt coupled under acid conditions with 1-amino-7-naphthol. The precipitated product was neutralized with caustic soda, filtered, washed and dried. 30 parts of the product of the following formula were obtained:

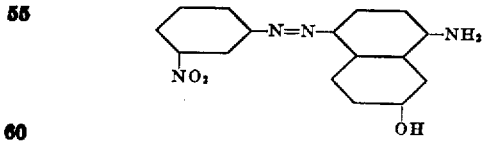

30 parts of the meta-nitraniline-azo-1-amino-7-naphthol were acylated by heating with 40 parts of acetic anhydride at 120° C. for 10 minutes to form meta-nitraniline-azo-1-aminoacyl-7-naphthol which was isolated from the reaction mass and purified as follows: The reaction mass was drowned in ice and water, and the precipitated product was filtered and washed free of acid. A solution of the sodium salt of this compound was made, as by dissolving the entire product in 60 parts of alcohol and 120 parts of caustic soda solution of 30% strength at 70° C., cooling the solution to about 20° C. with ice, diluting with cold water to about 600 parts total volume, and filtering to remove insoluble matter. The filtrate containing the sodium salt in solution was acidified with hydrochloric acid to regenerate the hydroxyl group and form a precipitate. The precipitate which consisted of the coupling component, meta-nitraniline-azo-1-aminoacetyl-7-naphthol was filtered, washed free of acid and dried. About 30 parts of the coupling component represented by the following formula were obtained:

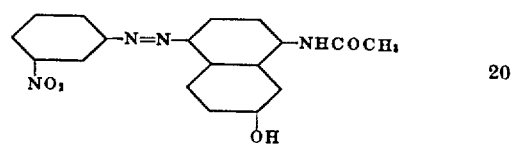

A printing paste was prepared according to the following formula:

| | Parts |
|---|---|
| Coupling component | 1.9 |
| Water-soluble diazoimino compound obtained by the action of diazotized 4-chloro-2-amino-anisole on methyl-glucamine | 2.1 |
| Cellosolve | 4.0 |
| Sodium-hydroxide solution—30% strength | 3.0 |
| Water | 19.0 |
| Starch tragacanth thickener | 70.0 |
| | 100.0 |

Cotton piece goods were printed with the above paste from an engraved copper roll, then dried. The prints were developed by exposing them to steam containing the vapors of acetic acid. The developed prints were rinsed with water, soaped in the usual manner, again rinsed and dried. The pattern was developed as a bluish brown, due to the formation of the new insoluble dye represented by the following formula.

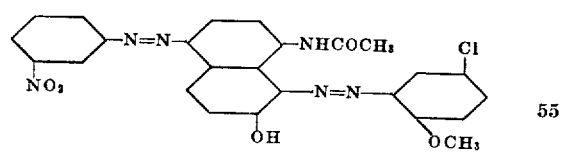

*Example II*

The printing process of Example I was repeated, substituting 1.9 parts of the tetrazo-imino compound obtained by the action of tetrazotized dianisidine on methyl-glucamine for the diazo-imino compound used in that example. The pattern was developed as a black, due to the formation of the new dye represented by the following formula:

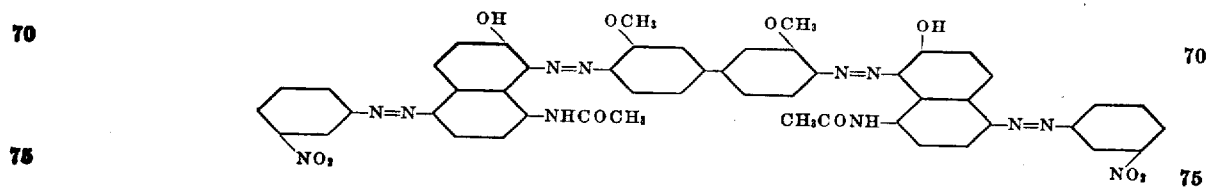

Example III

The printing process of Example I was repeated, substituting 1.9 parts of the diazoimino compound obtained by the action of diazotized 4-chloro-2-amino-toluene on piperidine-a-carboxylic-acid for the diazo-imino compound used in that example. The printed pattern was developed as a reddish brown due to the formation of the new dye represented by the following formula:

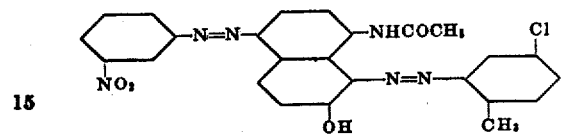

Example IV

The printing process of Example I was repeated, substituting 1.8 parts of the diazoimino compound obtained by the action of diazotized aniline on piperidine-a-carboxylic-acid for the diazoimino compound used in that example. The printed pattern was developed as a reddish brown due to the formation of the new dye represented by the following formula:

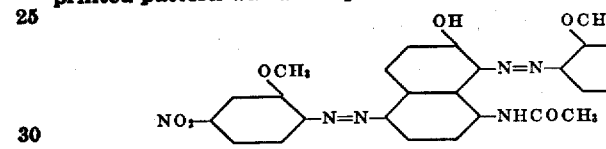

Example V

The printing process of Example I was repeated, substituting 1.5 parts of the nitrosamine from 2:5-dichloro-aniline of 80% strength for the diazoimino compound used in that example. The printed pattern was developed as a reddish brown due to the formation of the new dye represented by the following formula:

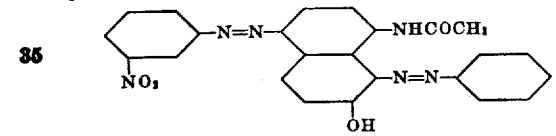

Example VI 16.8 parts of 5-nitro-2-amino-anisole were diazotized in the usual manner and the diazo-salt coupled under acid conditions to 17.5 parts of 1-amino-7-naphthol. The product was isolated as in Example I. 32 parts of the azo-amino-naphthol compound were obtained.

20 parts of this azo-amino-naphthol were acylated with 40 parts of acetic-anhydride by the procedure described in Example I, forming a coupling component which was purified as described in that example. 20.2 parts of the coupling component represented by the following formula were obtained:

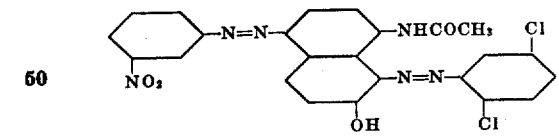

Cotton piece goods was printed by the process of Example I, utilizing 2.6 parts of this coupling component and 1.4 parts of nitrosamine from 2:5-dichloro-aniline of 80% strength as the diazo component. The printed pattern was developed as a deep brown, due to the formation of the insoluble dye represented by the following formula:

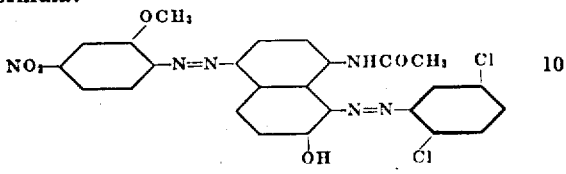

Example VII

The printing process of Example I was repeated, utilizing 2.2 parts of the coupling component of Example VI and 1.8 parts of the tetrazoimino compound obtained by the action of tetrazotized dianisidine on methyl-glucamine as the diazo component. The printed pattern was developed as a black, due to the formation of the insoluble dye represented by the following formula:

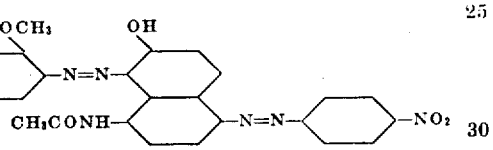

Example VIII 16.1 parts of 2:5-dichloro-aniline were diazotized in the usual manner and coupled to 17.5 parts of 1-amino-7-naphthol by a procedure similar to that described in Example I. 31 parts of amino-azo compound were obtained:

30 parts of this azo amine were acylated with 30 parts of acetic-anhydride by a process similar to that described in Example I and 31.5 parts of a dark brown coupling component represented by the following formula were obtained:

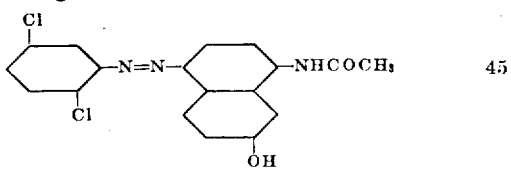

Cotton piece goods were padded in the usual manner with an alkaline solution of this coupling component. The padded goods were immersed in a diazo solution prepared from 2:5-dichloro-aniline. The developed fabric was rinsed, soaped, rinsed and dried in the usual manner. The fabric was dyed a reddish brown of good fastness properties, due to the formation of the insoluble dye represented by the formula:

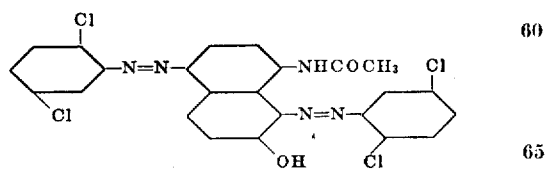

Example IX 13.8 parts of meta-nitraniline were diazotized in the usual manner and coupled under acid conditions to 17.5 parts of 1-amino-6-naphthol, by the procedure described in Example I. 30 parts of amino-azo compound were obtained:

30 parts of this compound were acylated with 30 parts of acetic-anhydride by the procedure described in Example I and 29.4 parts of a dark brown coupling component were obtained. The printing process of Example I was repeated, using 2.0 parts of this coupling component and 2.0 parts of the diazoimino compound obtained by the action of diazotized 4-chloro-2-amino-anisole on piperidine-a-carboxylic-acid. The printed pattern was developed as a brown, due to the formation of the insoluble dye represented by the following formula:

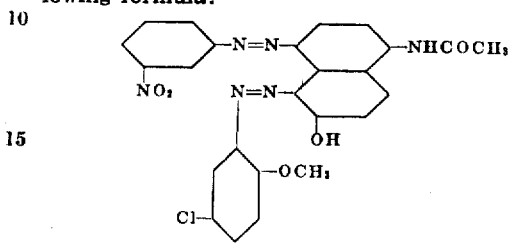

Example X 13.8 parts of meta-nitraniline were diazotized and the diazo-salt coupled under acid conditions to 17.5 parts of 2-amino-6-naphthol, yielding 29 parts of amino-azo compound.

30 parts of this amino-azo compound were acylated with acetic-anhydride, yielding 27 parts of dark brown coupling component.

The printing process of Example I was repeated, utilizing as active color ingredients 2.0 parts of this coupling component and 2.0 parts of the water-soluble diazoimino compound obtained by the action of diazotized 4-chloro-2-amino-anisole on piperidine-a-carboxylic-acid. The printed pattern was developed as a brown, due to the formation of the color represented by the following formula:

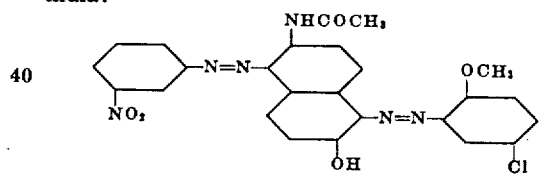

Example XI 10 parts of the amino-azo compound produced in accordance with Example VIII were benzoylated by treatment with an excess of benzoyl chloride in aqueous-alkaline suspension. The excess benzoyl chloride was hydrolyzed, and the insoluble product removed by filtration. It was purified by the procedure described in Example I. 11.0 parts of the dark brown coupling component were obtained.

Cotton piece goods were printed by the procedure described in Example I, utilizing 2.6 parts of this coupling component and 1.4 parts of the nitrosamine from 2:5-dichloro-aniline of 80% strength as the diazo component. The printed pattern was developed as a dark brown, due to the formation of the insoluble dye represented by the following formula:

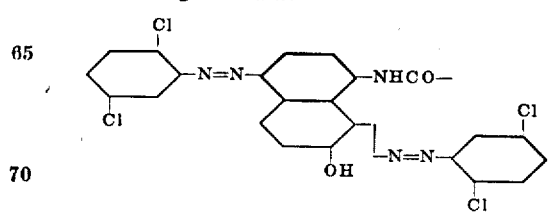

Example XII

The coupling component described in Example I, was reduced with sodium sulfhydrate, producing the new coupling component represented by the following formula:

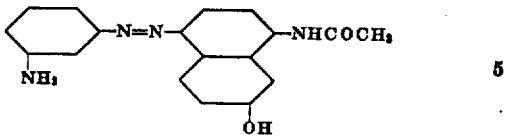

The printing process of Example I was repeated, utilizing as active ingredients in the printing paste 1.9 parts of this coupling component and 2.1 parts of water-soluble diazoimino compound obtained by the action of diazotized 4-chloro-2-amino-anisole on piperidine-a-carboxylic-acid. The printed pattern was developed as a reddish brown, due to the formation of the insoluble dye represented by the following formula:

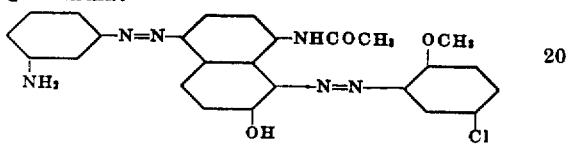

Example XIII

The coupling component described in Example XII, was acylated in the usual manner, yielding a new coupling component represented by the following formula:

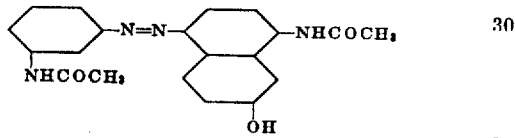

Cotton piece goods were printed by the process of Example I, utilizing as color ingredients 2.0 parts of this coupling component and 2.0 parts of the diazoimino compound obtained by the action of diazotized 4-chloro-2-amino-anisole on piperidine-a-carboxylic-acid. The printed pattern was developed as a reddish brown, due to the formation of the insoluble dye represented by the following formula:

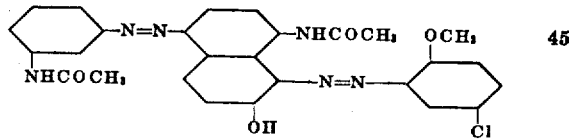

Table I shows other coupling components and dyes which have been made and used. The coupling components are listed under the general heading "Coupling components" and under this general heading is a column entitled "Arylamine diazotized" in which appear the arylamines which were diazotized and coupled to the compounds in the second column which is entitled "Coupled to." The arylazo-amino-naphthols thus produced were acylated with the acids appearing in the column entitled "Acylated with," and the coupling components produced are represented by the formula listed under the heading, "Formula of coupling component."

The coupling components were coupled with the diazo components listed under the general heading "Diazo component." Under this general heading is a column entitled "Amine diazotized" in which appear the arylamines which were diazotized and a column entitled "Stabilized with" in which appear the compounds with which the diazotized arylamines were stabilized against reaction with the coupling component in the manner similar to that described in Example I. The column entitled "Color of dye" shows the color of the dye produced by the various combinations.

Table I

| Example | Coupling component | | | | Diazo component | | |
|---|---|---|---|---|---|---|---|
| | Arylamine diazotized | Coupled to— | Acylated with— | Formula of coupling component | Amine diazotized | Stabilized with— | Color of dye |
| XIV | Aniline | 1:7-amino naphthol | Acetic anhydride | ⬡—N=N—⬡⬡—NHCOCH₃, OH | Aniline | Piperidine-a-carboxylic-acid | Reddish brown |
| XV | do | do | do | do | 4-chloro-2-amino-toluene | do | Do. |
| XVI | do | do | do | do | 4-chloro-2-amino-anisole | Methyl-glucamine | Do. |
| XVII | do | do | do | do | Dianisidine | do | Black. |
| XVIII | do | do | do | do | 2:5-dichloro-aniline | As nitrosamine | Reddish brown |
| XIX | 3-nitro-4-amino-toluene | 2:6-amino-naphthol | do | CH₃—⬡(NO₂)—N=N—⬡⬡—NHCOCH₃, OH | 4-chloro-2-amino-anisole | Methyl-glucamine | Do. |
| XX | 4-chloro-2-amino-toluene | 1:7-amino naphthol | do | CH₃—⬡(Cl)—N=N—⬡⬡—NHCOCH₃, OH | do | do | Do. |
| XXI | 4-nitro-2-amino-anisole | do | do | OCH₃—⬡(NO₂)—N=N—⬡⬡—NHCOCH₃, OH | Dianisidine | do | Black. |
| XXII | 4-chloro-2-amino-anisole | do | do | OCH₃—⬡(Cl)—N=N—⬡⬡—NHCOCH₃, OH | 2:5-dichloro-aniline | As nitrosamine | Reddish brown |
| XXIII | Para-phenetidine | do | do | C₂H₅O—⬡—N=N—⬡⬡—NHCOCH₃, OH | 4-chloro-2-amino-anisole | Piperidine-a-carboxylic-acid | Do. |
| XXIV | Ortho-phenetidine | do | do | ⬡(OC₂H₅)—N=N—⬡⬡—NHCOCH₃, OH | do | do | Do. |
| XXV | Alpha-amino-anthraquinone | do | do | (anthraquinone)—N=N—⬡⬡—NHCOCH₃, OH | do | do | Dark brown |
| XXVI | Meta-nitraniline | do | Benzoyl-chloride | ⬡(NO₂)—N=N—⬡⬡—NHCOC₆H₅, OH | do | do | Do. |

Table I—Continued

| | Coupling component | | | | Diazo component | | |
|---|---|---|---|---|---|---|---|
| Example | Arylamine diazotized | Coupled to— | Acylated with— | Formula of coupling component | Amine diazotized | Stabilized with— | Color of dye |
| XXVII | 3-nitro-4-aminotoluene. | 1:7-aminonaphthol. | Benzoylchloride. | [structure: CH₃–C₆H₃(NO₂)–N=N–naphthyl(OH)–NHCOC₆H₅] | Dianisidine. | Methylglucamine. | Black. |
| XXVIII | 4-chloro-2-aminotoluene. | ....do...... | ....do...... | [structure: CH₃,Cl-phenyl–N=N–naphthyl(OH)–NHCOC₆H₅] | 4-chloro-2-aminoanisole. | ....do...... | Dark brown. |
| XXIX | 4-nitro-2-aminoanisole. | ....do...... | ....do...... | [structure: OCH₃,NO₂-phenyl–N=N–naphthyl(OH)–NHCOC₆H₅] | ....do...... | ....do...... | Do. |
| XXX | 5-nitro-2-aminoanisole. | ....do...... | ....do...... | [structure: NO₂,OCH₃-phenyl–N=N–naphthyl(OH)–NHCOC₆H₅] | ....do...... | ....do...... | Reddish black. |
| XXXI | 4-chloro-2-aminoanisole. | ....do...... | ....do...... | [structure: OCH₃,Cl-phenyl–N=N–naphthyl(OH)–NHCOC₆H₅] | Dianisidine. | ....do...... | Black. |
| XXXII | ....do...... | ....do...... | Furoylchloride. | [structure: OCH₃,Cl-phenyl–N=N–naphthyl(OH)–NHCO-furyl] | 4-chloro-2-aminoanisole. | Piperidine-a-carboxylic acid. | Dark brown. |
| XXXIII | ....do...... | ....do...... | Hexahydrobenzoylchloride. | [structure: OCH₃,Cl-phenyl–N=N–naphthyl(OH)–NHCO-cyclohexyl] | ....do...... | ....do...... | Do. |
| XXXIV | ....do...... | ....do...... | Methylchlorocarbonate. | [structure: OCH₃,Cl-phenyl–N=N–naphthyl(OH)–NH–COOCH₃] | ....do...... | ....do...... | Do. |
| XXXV | 3-nitro-4-aminotoluene. | ....do...... | Acetic-anhydride. | [structure: CH₃,NO₂-phenyl–N=N–naphthyl(OH)–NHCOCH₃] | Dianisidine. | Methylglucamine. | Black. |
| XXXVI | Meta-nitraniline. | 1:5-aminonaphthol | ....do...... | [structure: NO₂-phenyl–N=N–naphthyl(NHCOCH₃)(HO)–N=N–C₆H₃(Cl)(OCH₃)] | 4-chloro-2-aminoanisole. | ....do...... | Brown. |

It will be apparent to those skilled in the art that many other useful compositions for the production of dyes may be produced, according to the present invention. For example, the azo imino component may be a water-soluble diazo-imino compound prepared from any of the arylamines used for the production of Diagen and so-called Ice Color bases. Among such arylamines, the following are mentioned for purposes of illustration:

Ortho-chloro-aniline
2,5-dichloro-aniline
4-chloro-2-amino-phenetol
Ortho-anisidine
4-chloro-2,5-dimethyl-aniline
4-benzoyl-amino-2,5-dimethoxy-aniline
5-nitro-2-amino-anisole
1-methoxy-2-naphthylamine
4-chloro-2-amino-diphenyl-ether
Meta-amino-benzo-trifluoride
Ortho-amino-azo-toluene
3,4'-diamino-diphenylamine
3-amino-carbazole It is evident that any of the usual stabilizing agents may be utilized in the composition with the water-soluble diazoimino derivatives. In addition to piperidine-a-carboxylic-acid and methyl-glucamine disclosed in the above examples, other stabilizers may be used, among which are the following:

Sarcosine
1-methylamino-ethane-2-sulfonic-acid
1-naphthylamine-2,4,8-trisulfonic-acid
2-ethylamino-4-sulfo-benzoic-acid
Proline
Nipecotinic-acid
Benzylene-imine-para-sulfonic-acid Likewise, it will be apparent that other derivatives of diazotized arylamines which are inactive toward coupling components in alkaline conditions, but which revert to the parent diazo under the influence of mild acids, may be utilized as the azo components instead of the diazoimino compounds given in the examples. Among such azo derivatives are the so-called nitrosamines (anti-diazotates) and azo-sulfonates.

Obviously, only a few members of the large series of the new coupling components which may be utilized in the present invention have been illustrated in the examples. All the arylamines commonly used in the Diagen and Ice Color arts may be diazotized and coupled under acid conditions with amino-naphthols, with the restriction that the amino group shall be substituted on one benzene ring of the naphthalene nucleus and the hydroxyl group shall be substituted on the other. Likewise, the amino-azo compounds obtained by this coupling may be acylated with any of the usual acylating agents. In addition to acetylation, benzoylation, furoylation, hexahydro-benzoylation and carbo-methoxylation mentioned in the examples, other examples of acylations are mentioned which may be effected by the use of agents such as:

Propionyl-chloride
Iso-valeryl-chloride
Para-nitro-benzoyl-chloride
Ortho-chloro-benzoyl-chloride
Alpha-naphthoyl-chloride
Anthraquinone-beta-carbonyl-chloride
Benzoic-anhydride
Butyl-chloro-carbonate
Phosgene
Para-nitro-phenyl-carbamyl-chloride The ratio of diazo derivatives to coupling components in the mixtures may be varied widely, but in most instances the best results are obtained if the two components are mixed in equimolecular ratio. Obviously, when a tetrazo derivative of arylene-diamine is used instead of a diazo salt derivative, two mols of coupling component may be required per mol of tetrazo component.

The new compositions may be produced as dry powders or in the form of pastes containing water and/or other liquids. Further, they may be produced in the form of solutions utilizing water or mixtures of water with miscible solvents, such as ethyl alcohol, an alkoxy ethylene glycol, ethanolamines, etc., as the solvent media. It is evident that such solutions should be neutral or alkaline in character, in order that the diazo components shall not revert to the parent diazo-salts and couple with the coupling components.

The above examples illustrate chiefly the printing of textile fibers with the new compositions. It will be understood that the materials to be dyed may be impregnated or imprinted, in various ways over a part or over their entire surfaces with the compositions, and the colors may then be developed in the usual manner. The fibers may be dyed in the manner well known to the art, rather than printed. Further, the new compositions may be dissolved or suspended in water or other suitable media, then treated with mild acids under suitable conditions of temperature and concentration, dilution, etc., in which case the new colors are produced as insoluble pigments. These pigments may be filtered off, purified if desired, and dried. They are useful in the field of insoluble azo pigments.

The above examples illustrate only the dyeing of cotton fibers. However, the products may be used for the coloring of other and various fabrics and materials, such as regenerated cellulose, cellulose esters and ethers. They also may be used for the coloring of other fibres and fabrics, such as wool, silk, etc. but with less satisfactory results with wool and silk.

The new compositions make possible the dyeing and printing of cotton to very dark brown and black shades by one-bath processes and without the use of low temperatures. The new compositions are readily manufactured at a reasonable cost, and they produce colors of excellent permanency and fastness. They possess the added advantage that they can be applied to textile fibers by processes which are economically and easily carried out in practice.

As many apparently widely different embodiments of this invention may be made without departing from the spirit and scope thereof, it is to be understood that we do not limit ourselves to the specific embodiments thereof except as defined in the appended claims.

We claim:
1. The compound formed by coupling a diazotized aryl amine to a compound represented by the formula

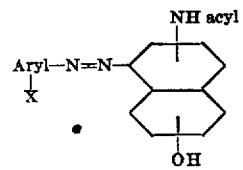

in which X is at least one of the group consisting of hydrogen, nitro, amino, aminoacyl alkyl, alkoxy, halogen, aryloxy, aralkyl, aralkoxy, hydroaryloxy and trifluoro-alkyl.

2. Azo dye represented by the formula

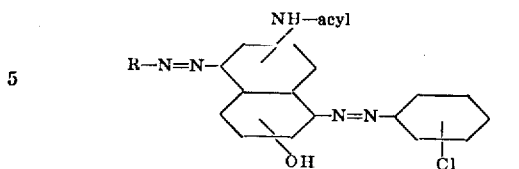

in which R is the aryl radical of a diazotizable aryl amine.

3. The azo dye represented by the formula

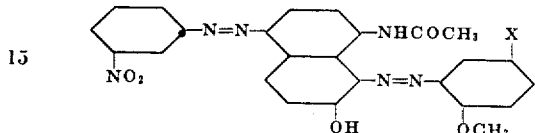

in which X is one of the group consisting of hydrogen and chlorine.

4. The azo dye represented by the formula

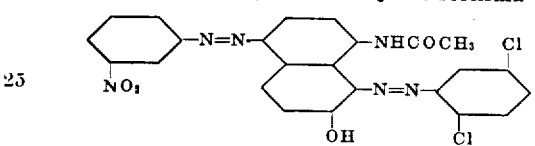

5. An azo dye identical with that which is produced by coupling an azo component consisting of a diazotized primary aryl amine which is free from water solubilizing groups and a coupling component consisting of an aryl-azo-acylamino-naphthol in which the NH-acyl and the aryl azo group are each connected to one of the benzene rings of the naphthalene nucleus and the OH is a substituent of the other benzene ring of said nucleus.

6. A textile fabric dyed with an azo dye identical with that which may be produced by coupling an azo component which is devoid of solubilizing groups, and a coupling component consisting of an aryl-azo-acylamino-naphthol in which the NH—acyl group and the aryl azo group are each connected to one of the benzene rings of the naphthalene nucleus and the OH group is a substituent of the other benzene ring of said nucleus.

7. A textile fabric dyed with an azo dye identical with that which may be produced by coupling under acid conditions an azo component comprising a diazotized aryl amine which is devoid of water solubilizing groups, and a coupling component consisting of an aryl-azo-acylamino-naphthol in which the NH—acyl group and the aryl azo group are each connected to one of the benzene rings of the naphthalene nucleus and the OH group is a substituent of the other benzene ring of said nucleus, said coupling component having at least one of the group consisting of hydrogen, nitro, amino, aminoacyl, alkyl, alkoxy, halogen, aryloxy aralkyl, aralkoxy, hydroaryloxy and trifluoroalkyl in the aryl nuclei thereof.

8. A textile fabric dyed with an azo dye identical with that which may be produced by coupling in acid conditions a diazotized primary aryl amine which is devoid of water solubilizing groups, and a coupling component which is devoid of solubilizing groups and consists of an aryl-azo-acylamino-naphthol in which the NH—acyl group and the aryl azo group are each connected to one of the benzene rings of the naphthalene nucleus and the OH is substituted in the other benzene ring of said nucleus.

9. A textile fabric dyed with an azo dye represented by the formula

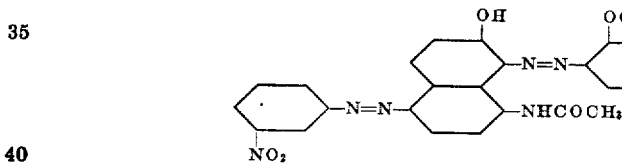
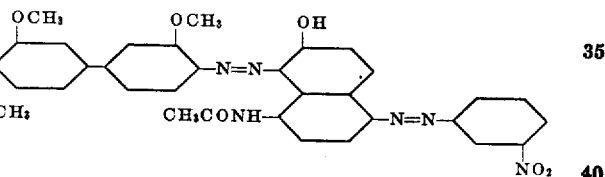

10. A textile fabric dyed with an azo dye represented by the formula

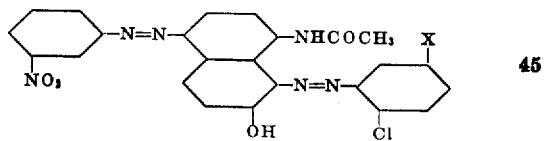

in which X is one of the group consisting of hydrogen and chlorine.

MILES A. DAHLEN.
FRITHJOF ZWILGMEYER.

CERTIFICATE OF CORRECTION.

Patent No. 2,135,964.                                                November 8, 1938.

MILES A. DAHLEN, ET AL.

It is hereby certified that error appears in the printed specification of the above numbered patent requiring correction as follows; Page 7, first column, line 22, for "3,4'-diamino-diphenylamine" read 4,4'-diamino-diphenylamine; and that the said Letters Patent should be read with this correction therein that the same may conform to the record of the case in the Patent Office.

Signed and sealed this 18th day of April, A. D. 1939.

Henry Van Arsdale (Seal)                                                    Acting Commissioner of Patents.

2. Azo dye represented by the formula

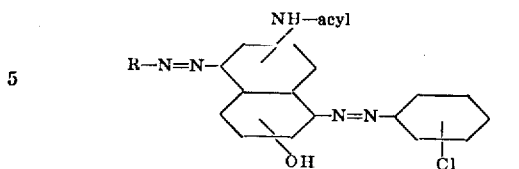

in which R is the aryl radical of a diazotizable aryl amine.

3. The azo dye represented by the formula

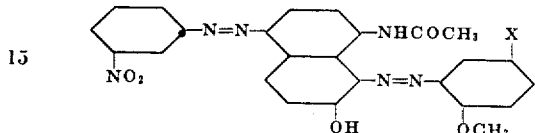

in which X is one of the group consisting of hydrogen and chlorine.

4. The azo dye represented by the formula

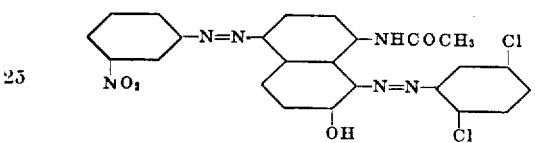

5. An azo dye identical with that which is produced by coupling an azo component consisting of a diazotized primary aryl amine which is free from water solubilizing groups and a coupling component consisting of an aryl-azo-acylamino-naphthol in which the NH-acyl and the aryl azo group are each connected to one of the benzene rings of the naphthalene nucleus and the OH is a substituent of the other benzene ring of said nucleus.

6. A textile fabric dyed with an azo dye identical with that which may be produced by coupling an azo component which is devoid of solubilizing groups, and a coupling component consisting of an aryl-azo-acylamino-naphthol in which the NH—acyl group and the aryl azo group are each connected to one of the benzene rings of the naphthalene nucleus and the OH group is a substituent of the other benzene ring of said nucleus.

7. A textile fabric dyed with an azo dye identical with that which may be produced by coupling under acid conditions an azo component comprising a diazotized aryl amine which is devoid of water solubilizing groups, and a coupling component consisting of an aryl-azo-acylamino-naphthol in which the NH—acyl group and the aryl azo group are each connected to one of the benzene rings of the naphthalene nucleus and the OH group is a substituent of the other benzene ring of said nucleus, said coupling component having at least one of the group consisting of hydrogen, nitro, amino, aminoacyl, alkyl, alkoxy, halogen, aryloxy aralkyl, aralkoxy, hydroaryloxy and trifluoroalkyl in the aryl nuclei thereof.

8. A textile fabric dyed with an azo dye identical with that which may be produced by coupling in acid conditions a diazotized primary aryl amine which is devoid of water solubilizing groups, and a coupling component which is devoid of solubilizing groups and consists of an aryl-azo-acylamino-naphthol in which the NH—acyl group and the aryl azo group are each connected to one of the benzene rings of the naphthalene nucleus and the OH is substituted in the other benzene ring of said nucleus.

9. A textile fabric dyed with an azo dye represented by the formula

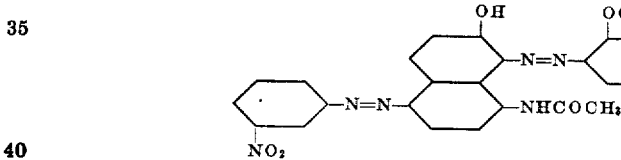
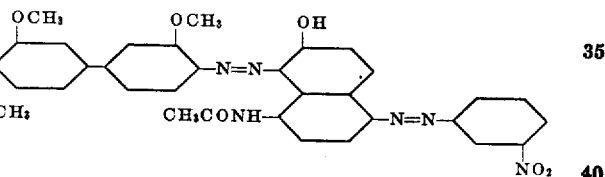

10. A textile fabric dyed with an azo dye represented by the formula

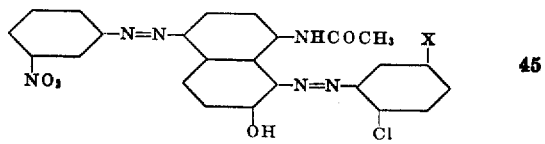

in which X is one of the group consisting of hydrogen and chlorine.

MILES A. DAHLEN.
FRITHJOF ZWILGMEYER.

---

CERTIFICATE OF CORRECTION.

Patent No. 2,135,964.   November 8, 1938.

MILES A. DAHLEN, ET AL.

It is hereby certified that error appears in the printed specification of the above numbered patent requiring correction as follows: Page 7, first column, line 22, for "3,4'-diamino-diphenylamine" read 4,4'-diamino-diphenylamine; and that the said Letters Patent should be read with this correction therein that the same may conform to the record of the case in the Patent Office.

Signed and sealed this 18th day of April, A. D. 1939.

Henry Van Arsdale (Seal)   Acting Commissioner of Patents.